United States Patent [19]

Doronin et al.

[11] Patent Number: 5,451,741
[45] Date of Patent: Sep. 19, 1995

[54] BACKING STRIP FOR WELDING TECHNOLOGY

[75] Inventors: Jurij V. Doronin, Moscow; Anatolij I. Retschkin, Twerj, both of Russian Federation

[73] Assignee: Leslot Industriebedarf GmbH, Germany

[21] Appl. No.: 167,912

[22] PCT Filed: Jun. 18, 1992

[86] PCT No.: PCT/EP92/01381
§ 371 Date: Feb. 22, 1994
§ 102(e) Date: Feb. 22, 1994

[87] PCT Pub. No.: WO92/22399
PCT Pub. Date: Dec. 23, 1992

[30] Foreign Application Priority Data

Jun. 19, 1991 [DE] Germany ............... 41 20 177.9

[51] Int. Cl.6 ............................................. B23K 9/32
[52] U.S. Cl. .................................. 219/160; 228/216
[58] Field of Search .................. 219/137 R, 160; 228/216

[56] References Cited

U.S. PATENT DOCUMENTS

| | | |
|---|---|---|
| 3,356,561 | 12/1967 | Squire et al. . |
| 3,365,566 | 1/1968 | Kuder . |
| 3,372,852 | 3/1968 | Cornell ................. 219/160 |
| 3,494,020 | 2/1970 | Cornell ................. 219/160 |
| 3,972,466 | 8/1976 | Keith ..................... 228/216 |
| 4,049,183 | 9/1977 | Roden et al. . |
| 4,759,981 | 7/1988 | Weil . |

FOREIGN PATENT DOCUMENTS

| | | |
|---|---|---|
| 57-100898 | 6/1982 | Japan . |
| 1609572 | 11/1990 | Russian Federation ........ 219/137 R |

Primary Examiner—Clifford C. Shaw
Attorney, Agent, or Firm—Diller, Ramik & Wight

[57] ABSTRACT

The invention provides a backing strip for welding technology which can be adapted to a large variety of welding methods and applications and is fully effective also in non-horizontal positions. This is obtained in that the more easily meltable forming layer (1) and the less easily meltable base layer (2) of a flexible thread structure of inorganic fibers are connected to form a flat band by binding the threads (10;20) into a two-layered unitary fabric structure.

13 Claims, 1 Drawing Sheet

BACKING STRIP FOR WELDING TECHNOLOGY

BACKGROUND OF THE INVENTION

The invention is directed to a backing strip for welding technology in one-sided welding of steel, comprising a flexible thread structure of inorganic fibers having a more easily meltable forming layer and a less easily meltable base layer.

Traditional double-sided welding of steel requires that subsequent welding is performed on the welding seam root and that the welding seam root is to be cleaned and planed from the front side. These procedures are time-consuming and bothersome and in some cases even impossible, e.g. in the welding of tubes, containers and elements in ship construction. In such special cases, welding is carried out from one side only. In butt welding, notably, a backing structure is used for root formation, i.e. for the formation of the welding bead on the backside of the seam. This backing structure must be adapted to limit the height and the width of the root and to form such an angle at the transition to the surface of the welded object that the weld joint has high strength and concentration of tension is avoided.

If the surfaces to be welded are linear or are only slightly curved, no particular demands are posed to the flexibility of the backing structure. In one-sided butt welding of pipes and similar strongly curved surfaces, however, there are needed flexible backing structures provided as strips of inorganic fibers. Such flexible backing structures are described in JP 47-94339 and JP-53-45297. These known backing structures consist of packed glass fiber strips being either bonded or pressed together and accommodated in a flexible cover. Welding involves the risk that the bonding material burns out or the cover is destroyed so that the backing strip, because of its disintegration, can be detached only with difficulties from the welding seam. These strips are adapted for one-time use only.

A flexible backing strip of the above type is disclosed in the Soviet author certificate No. 093 010. This known backing strip comprises a more easily meltable forming layer of glass fiber fabric and a less easily meltable base layer of glass fiber fabric, with the strengths of the fibers being identical. The different melting temperatures are obtained by the composition of the respective glass fibers which is adapted to the one-sided welding of unalloyed steel and steel with low carbon content. The base layer and the forming layer are produced as separate band-shaped strips which during manufacture of the backing strip are connected by mutual adhesion. Therefore, it cannot be excluded that the forming layer and the base layer become separated during welding so that multiple use is mostly impossible. The backing strip is bonded by an adhesive layer onto a wider flexible carrier strip enabling adhesion of the backing strip on the object to be welded. It is also known to provide the flexible carrier strip with permanent magnets for effecting attachment on the metal surface of the object to be welded. This type of backing strip suffers from a restricted range of applications, from being limited to one-time use and from decreased effectiveness when welding in non-horizontal positions.

SUMMARY OF THE INVENTION

It is the object of the invention to provide a backing strip for welding technology which can be adapted to a large variety of welding methods and applications and is fully effective also in non-horizontal positions.

According to the invention, it is provided that the forming layer and the base layer are connected to form a flat band by binding the threads into a two-layered unitary fabric structure, or, respectively, that the forming layer comprises a hose of intertwined threads and the base layer comprises a rope of bundled fibers sticking in said hose. In this manner, a reliable attachment between the forming layer and the base layer is safeguarded before and after use. The backing strip can be detached as one unit from the welding seam root. Since no adhesive connecting face exists between the forming layer and the base layer, there is accomplished a good gas permeability of the entire backing strip which is specifically advantageous when welding in non-horizontal positions. When welding is performed in a horizontal position, the incurred gases flow through the molten metal of the welding puddle and issue therefrom, thus not impairing the quality of the welding puddle. However, when welding is performed on non-horizontal faces, incurred gases impinge on the welding edge and the major portion of these gases is captured in the metal of the welding seam. In overhead welding, the gases hit the backing strip and again cannot find a way out of the molten metal as of yet. In all of these cases, the gas remaining in the welding puddle causes porosity of the metal of the welding seam and generates gas channels, thereby impairing the quality of the welding stock. The backing strip of the invention, due to its unhindered gas permeability, precludes the occurrence of pores and gas channels in the metal of the welding seam, which is of particular value in welding processes in non-horizontal positions.

The flat strip because of its high flexibilty, adapts to the form of the welding stock, and the strip further allows equal distribution of temperature on the welding seam root during welding, having a favorable effect on the form and the surface quality of the welding seam root. A similarly favorable effect is obtained by backing strip which can be produced in a cost-saving manner and, when arranged with circular cross section, is particularly useful as a cord in thick metal sheets wherein the backing strip must be laid into a groove of the butt-jointed metal sheets.

The two backing strips provided according to the basic principle of the invention are optimized by the ranges of density of the threads of the forming layer and the base layer and by the packing density of the threads of these layers. The backing strip has values for different welding methods, suitable for preventing the occurrence of pores and gas channels in the metal of the welding seam. The backing strip may also be advantageously used in submerged arc welding, in welding by use of filler wire and in manual arc welding. The backing strip is recommendable for MIG welding (welding with protective gas), and the backing strip of is particularly suited for welding with a non-melting electrode.

The positive effect of the backing strip resides in that the density of the threads and the packing density of the threads in the two layers are attuned to each other in such a manner that, one the one hand, a welding root of a required size is formed during welding, and, on the other hand, the gas generated during welding will leave the welding puddle through the spaces between the threads and the layers of the backing strip—independently of the orientation in which welding is carried out. The quality of the welded object, above all the notched bar impact capability of the metal and the welding seam, is excellent.

Further embodiments of the invention include values of the volumetric density of the forming layer which are favorable for different kinds of arc welding in the sense of the above explanations.

BRIEF DESCRIPTION OF THE DRAWINGS

Preferred embodiments of the invention will be explained hereunder with reference to the drawings.

BRIEF DESCRIPTION OF THE PREFERRED EMBODIMENTS

Figure 1:
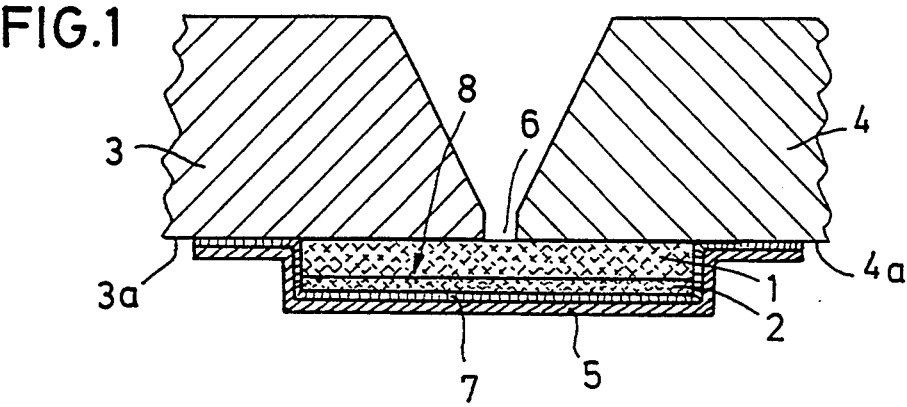
FIG. 1 shows a cross-sectional view of a flat backing strip laid against a sheet metal joint to be welded.

The flexible backing strip 8 provided for welding technology in one-sided welding of steel comprises a forming layer 1 and a base layer 2 made from threads 10,20, respectively, of inorganic fibers. The forming layer 1 and the base layer 2 are connected to each other by binding the threads 10,20 into a two-layered unitary fabric structure forming the flat backing strip 8. In the example shown in the Figures, the backing strip 8 with the base layer 2 at the bottom thereof is bonded onto a permanent adhesive layer 7 arranged on a flexible carrier strip 5 made from metal foil; during non-use, those strip portions of adhesive layer 7 which on both sides project beyond backing strip 8 are covered by removable anti-adhesion foils.

For fastening the backing strip 8 to the joint or abutment region 6 of two metal sheets 3,4, e.g. on the inner surface of two pipes to be interconnected, the anti-adhesion foils are pulled off the flexible carrier strip 5 and strip 5 is pressed against faces 3a,4a of metal sheets 3,4 across the lateral edges of backing strip 8 so that the permanent adhesive layer 7 sticks to faces 3a,4a and backing strip 8 is oriented in the desired position with respect to joint region 6.

During welding, separation of forming layer 1 and base layer 2 is avoided by arrangement of backing strip 8 as a unitary fabric structure so that backing strip 8 can be taken out of the tube as a unitary piece after welding. Since, moreover, forming layer 1 will melt only in a narrow longitudinal zone during generation of the welding seam, backing strip 8 can be used a plurality of times by being placed each time with a not yet molten zone of forming layer 1 under the next butt seam to be welded.

The forming layer 1 serves for forming the welding seam root while base layer 2 holds the metal to the welding seam and at the same time releases volatile products.

Depending on the respective application of backing strip 8, the densities of the threads 10 and 20 of forming layer 1 and base layer 2 as well as the packing density of threads 10 and 20 are selected differently. According to the invention, the density of threads 10 of forming layer 1 is in a range of 570 to 640 tex (thread weight/thread length) while the density of tread 20 of base layer 2 is 0.8 to 0.9 of this value. The packing density of threads 10 of forming layer 1 is in the range of 30 to 40 nr./dm (number of threads per decimeter) and the packing density of threads 20 of basic layer 2 is in the range of 16 to 26 nr./dm (number of threads/ dm). The larger value of the thread density is associated to the larger thread diameter.

An enlarged thread diameter provides improved conditions for guaranteeing a desired height of the welding seam root. In submerged arc welding, in welding with filler wire and in manual arc welding, the welding seam root is larger than in welding with protective gas (MIG welding) using a melting or non-melting electrode. At the same time, the packing density of the threads 10 guarantees—within the predetermined range—the uniformity of the melding process of the slag generated upon melting of forming layer 1. The claimed packing density of threads 10,20 safeguards the slack quantity required for seam formation, and the density of threads 10, 20 (thread diameter) determines the height of the welding seam root. For unobstructed discharge of gases occurring during the melting of forming layer 1 and for holding the metal in place, base layer 2 is produced from threads 20 having a low tex value, i.e. of thinner threads. The packing density of threads 20 of base layer 2 proposed by the invention provides for sufficient gas passages in base layer 2, and this effect is optimized by the selection of suitable tex values.

Backing strip 8 is manufactured by the ribbon weaving method using different glass fiber stocks; for the processing, there are used threads with different tax values, melting temperatures, chemical compositions while applying advantageous packing technologies.

For securing the desired properties, the forming layer 1 is produced from alkaline and non-alkaline threads in the range of 570 to 640 tex and the base layer 2 is produced from threads 20 of quartz and kiesel guhr in the range of 500 to 580 tex.

In case of changes of the strength and the packing density of the threads 10,20, the overall profile of backing strip 8 will be changed. There will occur changes in layer thickness and decreases or increases of the distances between threads 10 or 20 of the respective layer 1 or 2.

For formation of a welding seam root of high quality which is distinguished by uniform size, avoidance of pores and bubbles and by the absence of slag enclosures and gas channels, a bath of slag is required whose quantity is dependent on the tex value of threads 10 of forming layer 1. The quantity of said bath of slag depends also on the density of the packing of threads 10 in forming layer 1 and is further determined by the slag mass entering the slag bath from the welding powder, the filler wire and an electrode coating.

Prevention of gas channels in the welding seam root is accomplished by lowering the packing density of threads 20 of base layer 2.

Experiments have shown that the range up to a maximum of 10000 cal/sm destillate energy provides specifically favorable conditions for a welding seam root without gas channels if the forming layer 1 and the base layer 2 have the following values:

In submerged arc welding, in welding by filler wire and in arc welding, the density of threads 10 of forming layer 1 is 615 to 640 tex and the packing density of the threads 10 is 30 to 34 nr./dm. The density of the threads 20 of base layer 2 required for holding the bath of slag is 500 to 530 tex, and gas permeability is enhanced by a packing density of threads 20 ranging from 22 to 26 nr./dm.

In protective gas welding with melting electrodes, the generation of the required quantity of the bath of slag demands a higher thread density and higher packing density. The values are preferably in the range of 595–620 tex and 33 to 37 nr./dm. A density of the threads 20 of the basic layer 2 between 500 to 530 tex with a minimum packing density of the threads 20 from 22 to 26 nr./dm guarantees optimum gas permeability of base layer 2.

In protective gas welding with non-melting electrodes, the minimal density of threads 10 of forming layer 1 is 570 to 600 rex with the maximum packing density of treads 20 of base layer 2 ranging from 36 to 40 nr./dm. It is not required in the above case to provide for maximum gas permeability because the quantity of occurring curring gases to be discharged is smaller and a packing density of threads 20 of basic layer 2 of 19 to 23 nr./dm will be sufficient.

Figure 2:
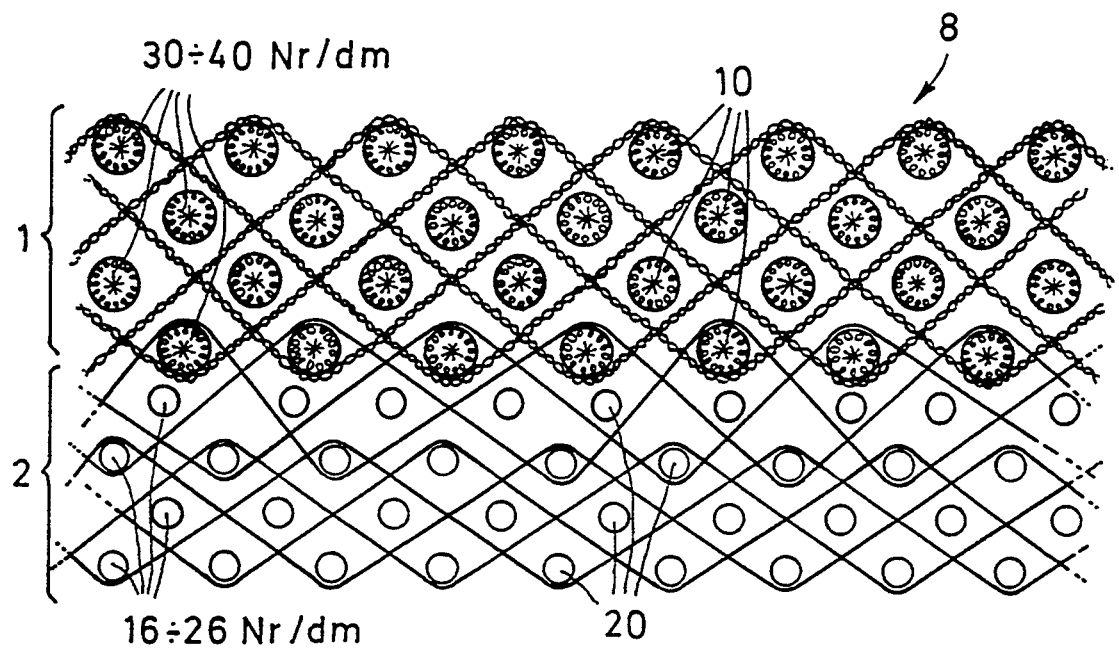
FIG. 2 shows a cross-sectional view of the backing strip of FIG. 1 at an enlarged scale.
Figure 3:
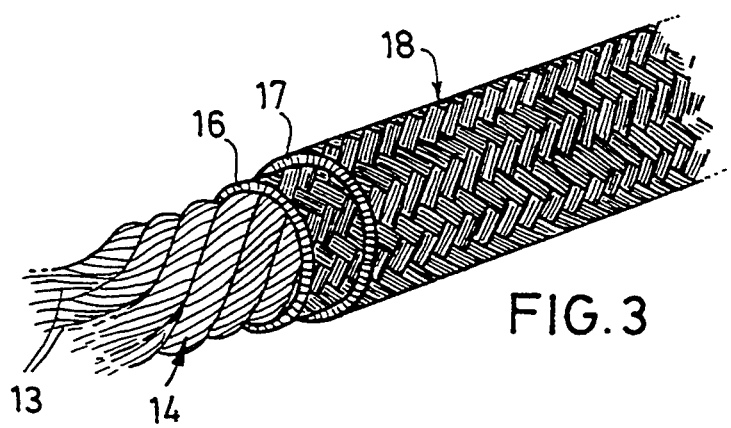
FIG. 3 shows a perspective view of a backing strip provided as a cord of circular cross section.

FIG. 3 illustrates a second embodiment of a backing strip 18 having circular cross section and being provided as a rope. This backing strip 18 comprises two hoses 17, 16 sticking concentrically within each other and being each braided of threads of inorganic fibers. The two hoses 16, 17 are of identical configuration and together constitute a forming layer. The inner hose 16 has a rope 14 of bundled fibers sticking therein which is preferably formed of twisted laid threads 13 of inorganic fibers and which forms the base layer. The values of the fiber density and the packing density of the forming layer and the base layer indicated in the example of FIGS. 1 and 2 apply also to the example of FIG. 3 wherein again the forming layer is used for formation of the root of the welding seam, and the rope 14 of bundled fibers, forming a base layer, serves for holding the metal of the welding seam and enhancing the gas discharge from the welding seam root.

Although a preferred embodiment of the invention has been specifically illustrated and described herein, it is to be understood that minor variations may be made in the apparatus without departing from the spirit and scope of the invention, as defined the appended claims.

We claim:

1. A backing strip for welding technology in one-sided welding of steel comprising a flexible thread structure of inorganic fibers having a more easily meltable forming layer and a less easily meltable base layer, the forming layer (1) and the base layer (2) each include threads, and said forming layer (1) and said base layer (2) are interconnected to form a flat band by intertwining the threads (10;20) into a two-layered unitary fabric structure.

2. The backing strip according to claim 1, wherein the density of all threads (10) of the forming layer (1) is 570–640 thread weight/thread length and the density of the threads (20) of the base layer (2) is 0.8–0.9 of this value, the packing density of the threads (10) of the forming layer (1) is 30–40 threads per decimeter and the packing density of the threads (20) of the basic layer (2) is 16–26 threads per decimeter.

3. The backing strip according to claim 2, wherein the density of all threads (10) of the forming layer (1) is 615–640 thread weight/thread length and the packing density of the threads (10) is 30–34 threads/decimeter, and the packing density of the threads (20) of the basic layer (2) is 22–26 threads per decimeter.

4. The backing strip according to claim 2, wherein the density of all threads (10) of the forming layer (1) is 595–620 thread weight/thread length and the packing density of the threads (10) is 33–37 threads/decimeter, and the packing density of the threads (20) of the basic layer (2) is 22–26 threads per decimeter.

5. The backing strip according to claim 1, wherein the density of all threads (10) of the forming layer (1) is 570–600 thread weight/thread length and the packing density of the threads (10) is 36–40 threads/decimeter, and the packing density of the threads (20) of the basic layer (2) is 19–23 threads per decimeter. layer (2) is 19–23 nr./dm (number of threads per decimeter).

6. The backing strip according to claim 1, wherein the volumetric density of the forming layer (1) is 0.4 to 1.1 g/cm$^3$ at a thickness of 1 to 2 mm.

7. The backing strip according to claim 1, wherein the volumetric density of the forming layer (1) is 0.4 to 0.6 g/cm$^3$.

8. The backing strip according to claim 1, wherein the volumetric density of the forming layer (1) is 0.7 to 0.8 g/cm$^3$.

9. The backing strip according to claim 1, wherein the volumetric density of the forming layer (1) is 0.9 to 1.1 g/cm$^3$.

10. A backing strip for welding technology in one-sided welding of steel comprising a flexible thread structure of inorganic fibers having a more easily meltable forming layer and a less easily meltable base layer, the forming layer (1) is provided as a hose (16,17) of intertwined threads and the base layer (2) comprises a rope (14) of bundled fibers internally housed in said hose (16,17).

11. The backing strip according to claim 10, wherein the threads of the hose (16,17) are woven, knitted or braided and that the rope (14) of bundled fibers is formed of linear or twisted laid threads (13).

12. The backing strip according to claims 10, wherein the backing strip (8) has substantially circular cross section.

13. The backing strip according to claim 10, wherein the backing strip (8) has substantially rectangular cross section.

* * * * *